US006319591B1

(12) United States Patent
Malhotra

(10) Patent No.: US 6,319,591 B1
(45) **Date of Patent: *Nov. 20, 2001**

(54) INK JET RECORDING SUBSTRATES

(75) Inventor: Shadi L. Malhotra, Mississauga (CA)

(73) Assignee: Xerox Corporation, Stamford, CT (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/277,691

(22) Filed: Mar. 26, 1999

(51) Int. Cl.[7] .......... B32B 3/00
(52) U.S. Cl. .......... 428/195; 428/690
(58) Field of Search .......... 428/695, 690

(56) References Cited

U.S. PATENT DOCUMENTS

| | | | | |
|---|---|---|---|---|
| 3,154,461 | | 10/1964 | Johnson | 161/116 |
| 3,515,626 | | 6/1970 | Duffield | 161/162 |
| 3,790,435 | | 2/1974 | Tanba et al. | 161/160 |
| 4,663,216 | | 5/1987 | Toyoda et al. | 428/212 |
| 4,705,719 | | 11/1987 | Yamanaka et al. | 428/323 |
| 4,795,676 | | 1/1989 | Maekawa et al. | 428/328 |
| 5,075,153 | | 12/1991 | Malhotra | 428/207 |
| 5,624,743 | | 4/1997 | Malhotra | 428/216 |
| 5,729,266 | * | 3/1998 | Malhotra | 377/102 |
| 5,763,128 | * | 6/1998 | Malhotra | 430/97 |
| 5,846,637 | * | 12/1998 | Malhotra et al. | 428/195 |
| 5,891,825 | * | 4/1999 | Ushio et al. | 503/227 |
| 6,210,816 | * | 4/2001 | Malhotra | 428/690 |

* cited by examiner

*Primary Examiner*—Bruce H. Hess
*Assistant Examiner*—Michael E. Grendzynski
(74) *Attorney, Agent, or Firm*—Judith L. Byorick

(57) ABSTRACT

Disclosed is a recording sheet containing a transparent substrate coated with a transparent hydrophilic ink receiving layer on the front side and a colorant opaque luminescent coating on the back side.

29 Claims, No Drawings

INK JET RECORDING SUBSTRATES

PATENT AND PENDING APPLICATIONS

Recording sheets are illustrated in U.S. Ser. No. 09/276,961, filed Mar. 26, 1999, the disclosure of which is totally incorporated herein by reference. The recording components of the present invention may be selected for the ink processes, such as thermal ink jet, drop on demand printing, continuous ink jet, acoustic ink yet, and the like, as illustrated for example, in copending applications, U.S. Ser. No. 08/935,929, now U.S. Pat. No. 5,931,995, U.S. Ser. No. 09/935,889, now U.S. Pat. No. 5,902,390, U.S. Ser. No. 08/935,639, now U.S. Pat. No. 5,922,117 and U.S. Ser. No. 08/933,914, now U.S. Pat. No. 5,958,119, the disclosures of which are totally incorporated herein by reference.

BACKGROUND OF THE INVENTION

The present invention is directed to ink jet recording sheets primarily for use in creating simulated photographic-quality images or prints with for example non-photographic imaging such as ink jet printing and xerography. More specifically, the present invention is directed to creating simulated, photographic-quality prints on a transparent or translucent recording sheet with pigmentless ink receiving hydrophilic layers on the front side of a transparent substrate, and wherein the back, or reverse side of the substrate is coated with a colorant layer containing luminescence imparting phosphors, liquid crystalline nitrites, or isothionitriles and which back side can be written upon with a pen, pencil, xerography and ink jet printing. Advantages of the recording components of the present invention include, for example, the enablement of enhanced ink jet image quality and brighter ink jet images.

PRIOR ART

U.S. Pat. No. 3,154,461 discloses a polymeric film with a matte-finish and a cellular structure achieved with the addition of fillers which roughens the surface upon stretching of the films and renders them receptive to marking by crayon, pencil and ball-point pen.

U.S. Pat. No. 3,515,626 discloses laminates comprising layers of oriented films of thermoplastic materials in which at least one of the outermost layers contains a suitable inert additive.

Disclosed in U.S. Pat. No. 3,790,435 are synthetic papers with acceptable foldability of a nonlaminated structure of one thermoplastic resin film or a laminated structure of at least two thermoplastic resin films. Each of the films can be stretched or molecularly oriented, and one or more of the films contain a fine inorganic filler to provide paperness of the film. According to this patent, some of the films may contain poly(styrene) as a foldability improving agent.

There is disclosed in U.S. Pat. No. 4,663,216 a synthetic paper printable in high gloss, and comprised of (1) a multilayer support; (2) a layer of a transparent film of a thermoplastic resin free from an inorganic fine powder formed on one surface of the support (1); and (3) an aqueous primer layer of a specific material, reference the Abstract of the Disclosure for example.

Further, there is disclosed in U.S. Pat. No. 4,705,719 a synthetic paper of multilayer resin film comprising a base layer (1*a*) of a biaxially stretched thermoplastic resin film, and a laminate provided on at least one of the opposite surfaces of the base layer, the laminate including a paper-line layer; (1*b*) a surface layer; and (1*c*) the paper like layer containing a uniaxially stretched film of thermoplastic resin containing 8 to 65 parts by weight of an inorganic fine powder, the surface layer containing a uniaxially stretched film made of thermoplastic resin. Also known is an electrostatic recording material comprised of a multi-layered sheet support with an electroconductive layer and dielectric layers formed thereon, reference, for example, U.S. Pat. No. 4,795,676.

Moreover, there is disclosed in U.S. Pat. No. 5,075,153 a never-tear paper comprised of a plastic supporting substrate, a binder layer comprised of polymers selected from the group consisting of (1) hydroxypropyl cellulose; (2) poly (vinyl alkylether); (3) vinylpyrrolidone/vinylvinylacetate; (4) quaternized vinylpyrrolidone/dialkyl aminoethyl/methacrylate; (5) poly(vinyl pyrrolidone); (6) poly (ethyleneimine) and mixtures thereof; and a pigment, or pigments.

Ink jet substrates such as transparencies and papers used in various printing and imaging processes are known. U.S. Pat. No. 5,624,743, the disclosure of which is totally incorporated herein by reference, discloses a transparency comprised of a supporting substrate, thereover a first coating layer comprised of a binder having a glass transition temperature of less than about 55° C., a cellulosic viscosity modifier, a lightfast compound and a biocide; and a second ink-receiving coating layer comprised of a hydrophilic binder, an oxyalkylene containing compound, a dye mordant, an optional filler, and an optional biocide; and wherein the first coating is in contact with the substrate and is situated between the substrate and the second ink coating, and which transparency possesses a haze value of from about 1 to about 10 and a lightfast value of from about 80 to about 95.

DETAILED DESCRIPTION OF THE INVENTION

Aspects of the present invention relate to a recording component, such as a recording sheet comprising a substantially transparent substrate situated between a hydrophilic ink receiving layer and a colorant hydrophobic luminescent layer; a recording sheet wherein the substrate thereof is selected from the group consisting of (1) polyethylene terephthalate; (2) polyethylene naphthalate; (3) polysulfone; (4) cellulose triacetate; (5) polyvinyl chloride; and (6) polypropylene; a recording sheet wherein the ink receiving layer is comprised of a hydrophilic polymeric binder, a dye mordant, an ink spreading compound, a lightfastness component, a filler, and a biocide; a recording sheet wherein the hydrophilic polymeric binder is present in an amount of from about 34 parts by weight to about 83 parts by weight, the ink spreading compound is present in an amount of from about 25 parts by weight to about 5 parts by weight, the dye mordant is present in an amount of from about 25 parts by weight to about 5 parts by weight, the lightfastness component is present in an amount of from about 12 parts by weight to about 1 part by weight, the filler is present in an amount of from about 1 part by weight to about 5 parts by weight, and the biocide is present in an amount of from about 3 parts by weight to about 1 part by weight, and wherein the total of these components is about 100 percent; a translucent inkjet component wherein the thickness of the ink receiving layer is from about 0.1 to about 25 microns; a recording sheet wherein the hydrophilic binder is selected from the group consisting of (1) ethylhydroxyethyl cellulose; (2) hydroxyethyl cellulose; (3) hydroxyethylmethyl cellulose; (4) hydroxypropylmethylcellulose; (5) sodium carboxymethyl cellulose; (6) poly(ethylene oxide); and mixtures thereof; a recording sheet wherein the hydrophilic binder is (1) ethylhydroxyethyl cellulose, or (2) hydroxypropyl methyl cellulose; a recording sheet wherein the ink receiving layer contains an ink spreading compound optionally present in amounts of from about 40 parts by weight to about 1 part by weight, and which compound is selected from the group consisting of amino alcohols, heterocyclic amines, and acid salts; a recording sheet wherein the ink spreading amino alcohols of the ink receiving layer are selected from the group consisting of (1) 2-(2-aminoethoxy) ethanol; (2) 2-amino-3-cyclohexyl-1-propanol; (3) amino hexanol; (4) 2-amino-3-methylbenzyl alcohol; and (5) 3-aminomethyl-3,5,5-trimethyl cyclohexanol; a recording sheet wherein the ink spreading heterocyclic amines of the ink receiving layer are selected from the group consisting of (1) 1-(3-amino-propyl)-2-pyrrolidone; (2) 4-(2-aminoethyl) morpholine; (3) 4-(3-aminopropyl) morpholine; (4) 1-(2-aminoethyl) piperazine; and (5) 4-amino-2,2,6,6-tetramethylpiperidine; a recording sheet wherein the ink spreading acid salts are selected from the group consisting of (1) tetra ethyl ammonium hexafluoro phosphate; (2) (R)-3-pyrrolidinolhydrochloride; (3) 4-bromopiperidine hydrobromide; (4) 3-amino-1H-isoindole hydrochloride; and (5) (S)-(+)-2-amino-3-cyclohexyl-1-propanol hydrochloride; a recording sheet wherein the ink spreading compounds are (1) 2-amino-3-methylbenzyl alcohol; (2) 3-aminomethyl-3,5,5-trimethyl cyclohexanol; (3) 4-(2-aminoethyl) morpholine, or (4) (S)-(+)-2-amino-3-cyclohexyl-1-propanol hydrochloride; a recording sheet wherein the colorant layer is a pigmented coating comprised of a polymeric binder, an antistatic agent, a colorant, such as a pigment, a luminescence imparting compound, an optional lightfastness compound and an optional biocide; a recording sheet wherein the colorant layer is comprised of from about 68 parts by weight to about 5 parts by weight of a polymeric binder, from about 30 parts by weight to about 1 part by weight of a luminescence imparting compound, from about 0.5 part by weight to about 10 parts by weight of an antistatic agent, from about 0.5 part by weight to about 10 parts by weight of a lightfastness compound, and from about 0.5 part by weight to about 74 parts by weight of a filler, and wherein the total of these amounts is about 100 parts; a recording sheet wherein the colorant layer contains a luminescent compound optionally present in amounts of from about 30 parts by weight to about 1 part by weight, and which compound is selected from the group consisting of inorganic phosphors, organic phosphors and polymeric phosphors; a recording sheet wherein the colorant layer contains a luminescent component optionally present in amounts of from about 30 parts by weight to about 1 part by weight, and which component is selected from the group consisting of nitrile functional liquid crystalline compounds of (1) 4(trans-4-pentyl cyclohexyl) benzonitrile; (2) 4'-pentyl-4-biphenyl carbonitrile; (3) 4'-(pentyloxy)-4-biphenylcarbonitrile; (4) 4'-hexyl-4-biphenyl carbonitrile; (5) 4'-(hexyloxy)-4-biphenylcarbonitrile; (6) 4'-heptyl-4-biphenyl carbonitrile; (7) 4'-heptyloxy-4-biphenyl carbonitrile; (8) 4'-octyl-4-biphenyl carbonitrile; and (9) 4'-(octyloxy)-4-biphenyl carbonitrile; a recording sheet wherein the colorant layer contains a luminescent component optionally present in amounts of from about 30 parts by weight to about 1 part by weight, and which component is selected from the group consisting of (1) 1-isothiocyanato-4-(trans-4-propylcyclohexyl) benzene; (2) 1-(trans-4-hexylcyclo hexyl)-4-isothiocyanato benzene; (3) 1-isothiocyanato-4-(trans-4-octylcyclohexyl) benzene; (4) 1-hexyl-4-(4-isothiocyanato phenyl) bicyclo[2.2.2]octane; (5) 1-(4-trans-hexylcyclohexyl)-4-[2-(4-isothiocyanatophenyl)ethyl]benzene; and (6) 4-isothiocyanato phenyl)-4-pentyl bicyclo[2.2.2]octane-1-carboxylate; a recording sheet wherein the colorant layer contains a liquid crystalline compound of (1) 4-(trans-4-pentyl cyclohexyl) benzonitrile; (2) 4'-(octyloxy)-4-biphenyl carbonitrile; or (3) 1-isothiocyanato-4-(trans-4-propylcyclohexyl) benzene, 4-isothiocyanato phenyl) 4-pentyl bicyclo [2.2.2] octane-1-carboxylate; a recording sheet wherein the ink layer or coating contains a polymer binder optionally present in an amount of from about 68 parts by weight to about 5 parts by weight, and which binder is elected from the group consisting of (1) a polyester latex; (2) an acrylic-vinyl acetate copolymer emulsion; (3) an ethyl cellulose; (4) a hydroxyethyl cellulose methacrylate; and (5) a poly(vinylidene fluoride-co-hexafluoropropylene); a transparency wherein the colorant is a pigment present in an amount of from about 0.5 to about 74 parts by weight, and which pigment is (1) titanium dioxide; (2) barium sulfate; (3) mixtures of calcium fluoride and silica; (4) zinc oxide; (5) mixtures of zinc sulfide and barium sulfate, or mixtures thereof of (1) to (4); a recording sheet wherein the thickness of the colorant coating in contact with the back side of the substrate is from about 0.1 to about 25 microns; a recording component comprising a substrate coated with a first transparent hydrophilic ink receiving layer on the front side and a colorant hydrophobic luminescent second coating on the back side or reverse side of the substrate; a recording component wherein the ink receiving layer is comprised of a hydrophilic polymeric binder, a dye mordant, an ink spreading compound, a lighffastness component, a filler and a biocide; a recording component comprised of a substrate situated between a hydrophilic ink layer and a colorant hydrophobic luminescent layer; a recording component wherein the substrate is transparent; a recording component wherein the ink receiving layer is comprised of a hydrophilic polymer binder, a dye, an ink spreading compound, a lightfastness component, a filler, and a biocide; a recording component wherein the lightfastness component is comprised of a mixture of a UV absorber, an antioxidant, an antiozonant, and mixtures thereof; a recording component wherein the lightfastness component is (1) octyl salicylate, Escalol-106; (2) hexadecyl-3,5-di-tert-butyl-4-hydroxy-benzoate, Cyasorb UV-2908; (3) 4-allyloxy-2-hydroxy benzophenone; (4) 2-(4-benzoyl-3-hydroxyphenoxy) ethylacrylate, Cyasorb UV-416; (5) 2-dodecyl-N-(1,2,2,6,6-pentamethyl-4-piperidinyl)succinimide, Cyasorb UV-3604; and (6) poly[N,N-bis(2,2,6,6-tetramethyl-4-piperidinyl)-1,6-hexane diamine-co-2,4-dichloro-6-morpholino-1,3,5-triazine); a recording component wherein the biocide is a nonionic biocide, an anionic biocide, or a cationic biocide; and a printing process utilizing a recording sheet illustrated herein; and translucent plastic recording sheets comprised of a substrate or base sheet with a coating on both lateral surfaces thereof.

Various suitable substrate can be selected for the recording components of the present invention. Examples of substrates are polyesters like MYLAR®, a polyethylene terephthalate, E.I. DuPont de Nemours & Company; MELINEX®, a polyethylene terephthalate, Imperial Chemicals, Inc.; and CELANAR®, a polyethylene terephthalate, Celanese Corporation; polyethylene naphthalates, such as Kaladex PEN films, Imperial Chemical Industries; polycarbonates, such as LEXAN®, General Electric Company; polysulfones, such as those available from Union Carbide Corporation; polyether sulfones, UDEL®, Union Carbide Corporation; polyether sulfones, VICTREX®, ICI Americas Incorporated; poly(arylene sulfones); cellulose triacetate; poly vinylchloride; cellophane; polyvinyl fluoride; polyimides; and the like, with polyester, such as MYLAR®, being preferred primarily because of its availability and relatively low cost. Typical thicknesses for the substrate are, for example, from about 50 to about 500 microns, and preferably from about 100 to about 125 microns, although the thickness can be outside these ranges.

The substrate is preferably transparent and is coated on one side with a hydrophilic ink receiving coating comprised of a polymeric binder or mixtures thereof, an ink spreading agent, a dye mordant, a lightfastness component, a biocide and a filler which functions primarily as a traction agent. Typically, the total thickness of this coating layer is from about 0.1 to about 25microns, and preferably from about 0.5 to 15 microns, although the thickness can be outside of these ranges. In the ink receiving coating composition, the binder components can be present within the coating in any effective amount; typically the binder is present in amounts of from about 8.9 parts by weight to about 86.9 parts by weight, and preferably from about 34 parts by weight to about 83 parts by weight, although the amounts can be outside of this range; the ink spreading agent is present in amounts of from about 40 parts by weight to about 1 part by weight, and preferably from about 25 parts by weight to about 5 parts by weight, although the amounts can be outside of this range; the dye mordant is present in amounts of from about 30 parts by weight to about 1 part by weight, and preferably from about 25 parts by weight to about 5 parts by weight, although the amounts can be outside of this range; the lightfastness component or compound can be present in amounts of from about 16 parts by weight to about 1 part by weight, and preferably from about 12 parts by weight to about 1 part by weight, although the amounts can be outside of this range; the biocide can be present in amounts of from about 5 parts by weight to about 0.1 part by weight, and preferably from about 3 parts by weight to about 1 part by weight, although the amounts can be outside of this range; and the filler can be present in amounts of from about 0.1 part by weight to about 10 parts by weight, and preferably from about 1 part by weight to about 5 parts by weight, although the amounts can be outside of this range.

The amounts can be determined, for example, as follows: Various blends of the binder, the ink spreading agent, dye preferably cationic dye mordant component, lightfast agent, filler, and biocide are generated in water and ethanol mixtures and coated on to various substrates such as polyester sheets to yield a transparent recording sheet with a single layer thereover. After drying the resulting polyester sheets at 100° C., they are tested for coating adhesion to MYLAR®, printed with a Xerox Corporation ink jet test fixture to, for example, check print quality, drying times of the images, lighffast values and intercolor bleed. The data of image drying time intercolor bleed, and lightfast values obtained as a function of the coating composition was analyzed statistically for optimum range of compositions. The first ink receiving layer comprised of (1) a hydrophilic binder; (2) an ink spreading agent; (3) a dye mordant; (4) a lightfast compounds; (5) a filler; and (6) a biocide is of the preferred composition range based on a total of 100 parts of (34+25+25+12+3+1=100) to (83+5+5+1+1+5=100). A preferred composition range is the binder present in amounts of from about 34 parts by weight to about 83 parts by weight, the ink spreading agent present in an amount of from about 25 parts by weight to about 5 parts by weight, the dye mordant, such as cationic complexing mordants present in an amount of from about 25 parts by weight to about 5 parts by weight, the lightfastness compounds present in amounts of from about 12 parts by weight to about 1 part by weight, the filler present in amounts of from about 1 part by weight to about 5 parts by weight, and the biocide compound present in amounts of from about 3 parts by weight to about 1 part by weight.

Examples of hydrophilic polymer binders are substantially water soluble or water soluble polymers, reference for example, U.S. Pat. No. 5,624,743, the disclosure of which is totally incorporated herein by reference, present in the first ink receiving layer in amounts of, for example, from about 8.9 parts by weight to about 86.9 parts by weight, and preferably from about 34 parts by weight to about 83 parts by weight, include (1) cellulose, #659, #660, Scientific Polymer Products; (2) cationic starch (such as Cato-72, National Starch); (3) hydroxy propyl starch #02382, Poly Sciences Inc.; (4) gelatin Calfskin gelatin #00639, Poly Sciences Inc.; (5) methyl cellulose (Methocel A4-M, Dow Chemical Company); (6) hydroxyethyl cellulose (Natrosol 250 LR), and (7) hydroxypropyl cellulose (Klucel Type E), both Hercules Chemical Company); (8) ethyl hydroxyethyl cellulose (Bermocoll, Berol Kem. A. B. Sweden); (9) hydroxyethyl methyl cellulose (HEM, British Celanese Ltd.); (10) hydroxypropyl methyl cellulose (Methocel K35LV, Dow Chemical Company); (11) hydroxy butylmethyl cellulose (HBMC, Dow Chemical Company); (12) diethyl ammonium chloride hydroxyethyl cellulose, Celquat H-100, L-200, National Starch and Chemical Company; (13) hydroxypropyl trimethyl ammonium chloride hydroxyethyl cellulose, Union Carbide Company; (14) sodium carboxymethyl cellulose CMC 7HOF, Hercules Chemical Company; (15) sodium cellulose sulfate #023, Scientific Polymer Products; (16) sodium carboxymethyl hydroxyethyl cellulose CMHEC 43H and 37L (Hercules Chemical Company); (17) poly(acrylamide) (#02806, Poly Sciences Inc.); (18) acrylamide-acrylic acid copolymers (#04652, #02220, and #18545); (19) poly (N,N-dimethyl acrylamide) (#004590, Poly Sciences Inc.); (20) poly(ethyleneoxide), POLYOX WSRN-3000, Union Carbide Corporation; and mixtures thereof.

Examples of ink spreading compounds of the hydrophilic ink receiving layer present in amounts of, for example, from about 40 parts by weight to about 1 part by weight, and preferably from about 25 parts by weight to about 5 parts by weight include:

(A) amino alcohols, such as (1) 2-(2-aminoethoxy) ethanol, Aldrich #A5,405-9; (2) 2-(2-amino ethylamino) ethanol, Aldrich #12,758-2; (3) amino-1-propanol, Aldrich #19,217-1; (4) 2-amino-3-cyclohexyl-1-propanol; (5) 2-amino-1-butanol, Aldrich #A4,380-4; (6) 4-amino-1-butanol, Aldrich #17,8330-0; (7) 2-amino-3-methyl-1-butanol, Aldrich #18,483-7; (8) 5-amino-1-pentanol, Aldrich #12,304-8; (9) 2-amino-1-hexanol, Aldrich #23,767-1; (10) 6-amino-1-hexanol, Aldrich #A5,635-3; (11) 2-amino-1-phenylethanol, Aldrich #A7,240-5; (12) 2-amino-3-methyl benzylalcohol, Aldrich #33,419-7; (13) 3-aminomethyl-3,5,5-trimethyl cyclohexanol, Aldrich #19,479-4;

(B) heterocyclic amines, such as (1) 1-(3-aminopropyl)-2-pyrrolidinone, Aldrich #13,656-5; (2) 3-aminopyrazole, Aldrich #16,064-4; (3) 5-amino-1-ethylpyrazole, Aldrich #29,576-0; (4) 3-amino-5-methylpyrazole, Aldrich #34,020-0; (5) 2-amino-4-methylthiazole, Aldrich #A6, 600-6; (6) 4-(2-aminoethyl) morpholine, Aldrich #A5, 500-4; (7)

2-amino-4-phenyl-5-tetradecylthiazole, Aldrich #14, 105-4; (8) 4-(3-aminopropyl) morpholine, Aldrich #12, 309-9; (9) 1-(2-aminoethyl) piperazine, Aldrich #A5, 520-9; (10) 4-(aminomethyl) piperidine, Aldrich #A6, 515-8; (11) 1-(2-aminoethyl) piperidine, Aldrich #14, 166-6; (12) 4-amino-2,2,6,6-tetramethyl piperidine, Aldrich #11,573-8;

(C) acid salts, such as (1) tetraethylammonium hexafluoro phosphate, Aldrich #28,102-6; (2) tetra butyl ammonium dihydrogen phosphate, Aldrich #26,809-7; (3) tetra methyl ammonium hydrogen phthalate, Aldrich #43,832-4; (4) (R)-(−)-3-pyrrolidinol hydrochloride, Aldrich #43,072-2; (5) 4-bromo piperidine hydrobromide, Aldrich #42,232-0; (6) 3-amino-1H-isoindolehydrochloride, Aldrich #41,592-8; (7) (S)-(+)-2-amino-3-cyclohexyl-1-propanolhydrochloride, Aldrich #43,226-1; and the like.

Suitable dye mordants for the first hydrophilic ink receiving layer present in amounts of, for example, from about 30 parts by weight to about 1 part by weight, and preferably from about 25 parts by weight to about 5 parts by weight, include: quaternary acrylic copolymer latexes such as HX-42-1, HX-42-3, Interpolymer Corporation; ammonium quaternary salts as disclosed in U.S. Pat. No. 5,320,902, the disclosure of which is totally incorporated herein by reference; phosphonium quaternary salts as disclosed in copending application U.S. Ser. No. 08/034,917 (D/92586), the disclosure of which is totally incorporated herein by reference; and sulfonium, thiazolium and benzothiazolium quaternary salts as disclosed in U.S. Pat. No. 5,314,747, the disclosure of which is totally incorporated herein by reference.

Also, the first or ink receiving coating preferably contains a lightfastness component present in amounts of, for example, from about 16 parts by weight to about 1 part by weight, and preferably from about 12 parts by weight to about 1 parts by weight. Examples of lightfastness components are illustrated in U.S. Pat. No. 5,624,743, the disclosure of which is totally incorporated herein by reference, such as for example those derived from (1) UV absorbing compounds; (2) antioxidant compounds; (3) antiozonant compounds, and (4) mixtures thereof. Typically a conventional lightfastness component is in the form of a composition and includes from about 8 parts by weight to about 0.5 part by weight, and preferably from about 6 parts by weight to about 0.5 part by weight of a UV absorbing compound, from about 4 parts by weight to about 0.25 part by weight, and preferably from about 3 parts by weight to about 0.25 part by weight of an antioxidant compound, and from about 4 parts by weight to about 0.25 part by weight, and preferably from about 3 parts by weight to about 0.25 part by weight of an antiozonant compound.

The preferred lightfastness compounds present in amounts of for example, from about 8 parts by weight to about 0.5 part by weight, and preferably from about 6 parts by weight to about 0.5 part by weight include: (1) octyl salicylate, Escalol-106, Van Dyk Corporation; (2) hexadecyl-3,5-di-tertbutyl-4-hydroxy-benzoate, Cyasorb UV-2908, #41,320-8; (3) 4-allyloxy-2-hydroxy benzophenone, #41,583-9; (4) 2-(4-benzoyl-3-hydroxyphenoxy) ethylacrylate, Cyasorb UV-416, #41,321-6; (5) 2-dodecyl-N- (1,2,2,6,6-pentamethyl-4-piperidinyl) succinimide, Cyasorb UV-3604, #41,318-6; (6) poly[N,N-bis(2,2,6,6-tetramethyl-4-piperidinyl)-1,6-hexane diamine-co-2,4-dichloro-6-morpholino-1,3,5-triazine), Cyasorb UV-3346, #41,324-0, and the like all available from Aldrich Chemical Company.

Lightfastness antioxidant compounds examples, which compounds are present in amounts of, for example, from about 8 parts by weight to about 0.5 part by weight, and preferably from about 6 parts by weight to about 0.5 part by weight include (1) didodecyl-3,3'-thiodipropionate (Cyanox, LTDP, #D12,840-6); (2) 2,6-di-tert-butyl-4-methylphenol, Ultranox-226, General Electric-Company; (3) 2,6-di-tertyl-α-di methylamino-4-cresol, Ethanox-703, Ethyl-Corporation; (4) 2,2'-methylene-bis(6-tert-butyl-4-ethyl phenol), Cyanox 425, #41,314-3, Aldrich Chemical Company; (5) N,N'-β,β-naphthalene-4-phenylene diamine, DNPD, Anchor Corporation, and the like.

Examples of lightfastness antiozonant compounds present in amounts of, for example, from about 8 parts by weight to about 0.5 part by weight, and preferably from about 6 parts by weight to about 0.5 part by weight include (1) N-isopropyl-N'-phenyl-phenylene diamine, Santoflex-IP, Monsanto Chemicals; (2) N,N'-di (2-octyl)4-phenylene diamine, Antozite-1, Vanderbilt-Corporation; (3) 2,4,6-tris-(N-1,4-dimethyl pentyl-4-phenylene diamino)-1,3,5-triazine, Durazone 37, Uniroyal Corporation, and the like.

The first coating or hydrophilic ink receiving layer preferably situated on the front side of the transparent substrate may contain traction controlling pigment or filler compounds present in amounts of from about 0.1 parts by weight to about 10 parts by weight, and preferably from about 1 part by weight to about 5 parts by weight. Examples of fillers compounds include zirconium oxide (SF-EXTRA Z-Tech Corporation); colloidal silicas, such as Syloid 74, Grace Company; titanium dioxide (Rutile or Anatase from NL Chem Canada, Inc.); hydrated alumina (Hydrad TMC-HBF, Hydrad TM-HBC, J. M. Huber Corporation); calcium carbonate (Microwhite Sylacauga Calcium Products); high brightness clays (such as Engelhard Paper Clays); calcium silicate (J. M. Huber Corporation); cellulosic materials insoluble in water or insoluble in organic solvents, like aromatic solvents, such as those available from Scientific Polymer Products.

Examples of suitable biocides which are illustrated for example, in U.S. Pat. No. 5,624,743, the disclosure of which is totally incorporated herein by reference, and present in the ink receiving layer in amounts of for example, from about 5 parts by weight to about 0.1 part by weight and preferably from about 3 parts by weight to about 1 part by weight include:

(A) nonionic biocides, such as (1) 2-hydroxypropylmethane thiosulfonate (Busan 1005, Buckman Laboratories Inc.); (2) 2-(thio cyanomethyl thio) benzothiazole (Busan 30WB, 72WB, Buckman Laboratories Inc.); (3) methylene bis (thiocyanate) (Metasol T-10, Calgon Corporation; AMA-110, Vinings Chemical Company; VICHEM MBT, Vineland Chemical Company; Aldrich #10,509-0);

(B) anionic biocides, such as (1) anionic potassium N-hydroxymethyl-N-methyl-dithiocarbamate (Busan 40 from Buckman Larboratories Inc.); (2) an anionic blend of methylene bis-thiocyanate, 33 parts by weight, sodium dimethyl-dithiocarbamate, 33 parts by weight, and sodium ethylene bisdithiocarbamate, 33 parts by weight, (Amerstat 282 from Drew Industrial Division; AMA-131 from Vinings Chemical Company); (3) sodium dichlorophene (G-4-40, Givaudan Corporation); and the like; and (C) cationic biocides, such as (1) cationic poly (oxyethylene (dimethylamino)-ethylene (dimethylamino) ethylene dichloride) (Busan 77, Buckman Laboratories Inc.); (2) a cationic blend of methylene bisthiocyanate and dodecyl guanidine hydrochloride (Slime-Trol RX-31, RX-32, RX-32P, RX-33, from Betz Paper Chem Inc.); (3) a cationic blend of a sulfone, such as bis (trichloromethyl) sulfone and a quaternary ammonium chloride (Slime-Trol RX-36 DPB-865 from Betz Paper Chem. Inc.).

The second colorant, preferably opaque coating or colorant hydrophobic luminescent layer is comprised of, for example, a polymeric binder, a luminescence imparting compound, an antistatic agent, a lighffast compound, filler and an optional biocide. The thickness of the second coating preferably in contact with the back side of the transparent substrate is from about 0.1 to about 25 microns and preferably from about 5 to about 20 microns.

In embodiments the second coating is comprised of from about 68 parts by weight to about 5 parts by weight, and preferably from about 65 parts by weight to about 10 parts by weight of a polymeric binder, from about 30 parts by weight to about 1 parts by weight and preferably from about 30 parts by weight to about 5 parts by weight of a luminescence imparting compound, from about 0.5 parts by weight to about 10 parts by weight, and preferably from about 2 parts by weight to about 10 parts by weight of an antistatic agent, from about 0.5 parts by weight to about 10 parts by weight, and preferably from about 2 parts by weight to about 10 parts by weight of a lightfast compound, and from about 0.5 parts by weight to about 74 parts by weight, and preferably from about 1 parts by weight to about 65 parts by weight of a filler.

Examples of binder polymers for the second coating on the back, or reverse side of the transparent substrate and present in amounts of, for example, from about 68.5 parts by weight to about 5 parts by weight, and preferably from about 65 parts by weight to about 10 parts by weight include water dispersible, or substantially water dispersible polymers such as:

(A) latexes such as (1) rubber latex, neoprene, Serva Biochemicals; (2) polyester latex, Eastman AQ 29D, Eastman Chemical Company; (3) ethylene-vinyl acetate copolymer emulsions, Airflex, Air Products and Chemicals Inc.; (4) acrylic-vinyl acetate copolymer emulsions, Rhoplex AR-74 Rohm and Haas Co; (5) vinyl acrylic terpolymer latex, 76 RES 3103, Union Oil Chemical Division; (6) acrylic emulsion latex, Rhoplex B-15J, Rhoplex P-376, Rohm and Hass, Company; (7) styrene-butadiene latexes, 76 RES 4100 and 76 RES 8100, Union Oil Chemicals Division; (8) poly(styrene) latex, Dow Chemicals; and (B) substantially solvent soluble polymers, such as (1) poly(2-hydroxyethylmethacrylate), #414, #815, and poly(hydroxy propyl methacrylate), #232, Scientific Polymer Products; (2) ethyl cellulose, Ethocel N-22, Hercules Chemical Company; (3) poly(vinylacetate), #346, #347, Scientific Polymer Products; (4) hydroxyethyl cellulose methacrylate, #8631, Monomer-Polymer and Dajac Laboratories Inc.; (5) poly (ethylene-co-ethylacrylate-co-maleic anhydride) copolymer #43,083-8; #43,084-6; (6) poly(ethylene-co-acrylic acid) copolymer #42,671-7, #42,672-5; (7) poly(ethylene-co-vinyl acetate)-graft-poly(maleic anhydride) copolymer #42,652-0, #42,653-9; (8) polystyrene-block-polyisoprene, #43,246-6; (9) polystyrene-block-polybutadiene, #43,248-2, #43,249-0; and (10) poly(vinylidene fluoride-co-hexafluoropropylene) as #42,716-0, available from Aldrich Chemicals; and other suitable polymers.

In addition, the second coating on the back side of the transparent substrate contains a luminescent composition capable of generating fluorescence, phosphorescence or chemiluminescence phenomenon and this composition is present in amounts of, for example, from about 30 parts by weight to about 1 part by weight, and preferably from about 30 parts by weight to about 5 parts by weight, and which composition is selected from the group consisting of inorganic powders, phosphors derived from calcium halophosphate, barium magnesium aluminate, magnesium aluminate, strontium chloropatite, zinc silicate and the oxides, oxysulfides, phosphates, vanadates and silicates of yttrium, gadolinium or lanthanum. Commonly used activators present are rare-earth ions such as europium II and III, terbium III, cerium III, and tin II. Fluorescent chemical compounds that can be selected and that convert UV radiation to visible radiation at the blue end of the spectrum, and which are known as fluorescent whitening agents or optical brighteners, are derived from stilbene, coumarin and naphthalimide. Other fluorescent brighteners are derived from fluorescent dyes, polymeric dyes such as polymeric phthalocyanines, and the like.

Commercially available colorants present in the second layer, preferably dispersed in polymers such as a polyamide or a triazine-aldehyde-amide are A-17-N Saturn yellow; A-18-N signal yellow; A-16-N arc yellow; A15-N blaze orange; A-14-N fire orange; A-13-N rocket red; A-12 neon red; A-11 aurora pink; A-21 corona magenta; A-19 horizon blue; materials that can be considered colorants that glow in the dark, that is luminescent colorants, like the Day-Glo-D-Series; Day-Glo-T-Series, Day-Glo-AX-Series, Day-Glo-SB-Series, Day-Glo-HM-Series, Day-Glo-HMS-Series, and the like; those dispersed in a polyester or triazine-aldehyde-amide, such as Radiant Color Corp. Radiant R-105 series, including R-105-810 chartreuse; R-105-811 green; R-105-812 orange-yellow; R-105-813 orange; R-105-814 orange-red; R-105-815 red; R-105-816 cerise; R-105-817 pink; R-103-G-118 magenta; R-103-G-119 blue; also included are materials from the R-203-G series; R-P-1600 series; R-P-1700 series; R-XRB series; R-K-500 series; and visiprint series; those dispersed in triazine-aldehyde-amide like Lawter Chemicals Lawter-B-Series including B-3539 lemon yellow; B-3545 green; B-3515 gold yellow; B-3514 yellow orange; B-3513 red orange; B-3534 red; B-3530 cerise red; B-3522 pink; B-3554 magenta; B-3556 vivid blue; the Lawter-G-3000-Series; and the Lawter-HVT-Series. Examples of luminescent imparting components are for example inorganic phosphors, especially powders thereof derived from calcium halophosphates as for example, indicated herein, polymer dispersed organic pigment phosphors, monomeric or polymeric dye based phosphors and which can be applied to various substrates via solvent coatings where for example dispersions of a polymer like a polyamide and a pigment like the DayGlo pigments and the phosphor is compounded with a polymer and dispersed or dissolved in a solvent such as ethanol, esters, ketones, glycol ethers and water. The use of solvents such as ethanol and water is preferred since they are less toxic. A primary function of the fluorescent components is to render the recording sheet translucent.

The second coating on the back side of the transparent substrate preferably contains a luminescent component comprised of a nitrile or an isothionitrile functionality containing liquid crystalline materials selected from the group consisting of (a) nitrile functional materials, such as (1) 4-(trans-4-pentyl cyclohexyl) benzonitrile, Aldrich #37,011-8; (2) 4'-pentyl4-biphenyl carbonitrile, Aldrich #32,851-0; (3) 4'-(pentyloxy)4-biphenylcarbonitrile, Aldrich #32,852-9; (4) 4-hexyl-4-biphenyl carbonitrile, Aldrich #33,864-8; (5) 4'-

(hexyloxy)-4-biphenylcarbonitrile, Aldrich #33,865-6; (6) 4'-heptyl4-biphenyl carbonitrile, Aldrich #33,081-7; (7) 4'-heptyl oxy-4-biphenyl carbonitrile, Aldrich #33,866-4; (8) 4'-octyl-4-biphenyl carbonitrile, Aldrich #33,868-0; (9) 4'-(octyloxy)-4-biphenyl carbonitrile, Aldrich #33,867-2; and (b) isothionitrile compounds (1) 1-isothiocyanato-4-(trans-4-propyl cyclohexyl)benzene, Aldrich #36,629-3; (2) 1-(trans-4-hexylcyclohexyl)-4-isothiocyanato benzene, Aldrich #36,685-4; (3) 1-isothiocyanato-4-(trans-4-octylcyclohexyl) benzene, Aldrich #36,686-2; (4) 1-hexyl-4-(4-isothio cyanato phenyl) bicyclo[2.2.2]octane, Aldrich #36,954-3; (5) 1-(4-trans-hexylcyclohexyl)-4-[2-(4-isothiocyanatophenyl)ethyl] benzene, Aldrich #37,725-2; (6) 4-isothiocyanatophenyl) 4-pentyl bicyclo[2.2.2]octane-1-carboxylate, Aldrich #37,005-3; and the like.

Further, the second coating on the back side of the transparent substrate preferably contains lightfast compounds present in amounts of, for example, from about 0.5 part by weight to about 10 parts by weight and preferably from about 2 parts by weight to about 10 parts by weight including UV absorbing compounds, antioxidants and antiozonants the same as, or similar those used in the first coating including (1) glycerol-4-amino benzoate, Escalol 106, from Van Dyk Corporation; (2) resorcinol monobenzoate, RBM, from Eastman Chemicals; (3) octyl dimethyl amino benzoate, Escalol 507, from Van Dyk Corporation; (4) didodecyl-3,3'-thiodipropionate, Cyanox, LTDP, #D12,840-6, from Aldrich Chemical Company; (5) ditridecyl-3,3'-thiodipropionate, Cyanox 711, #41,311-9, from Aldrich Chemical Company; (6) N-isopropyl-N'-phenyl-phenylene-diamine, available as Santoflex IP, from Monsanto Chemicals; (7) N-(1,3-dimethylbutyl)-N'-phenyl-phenylene-diamine, Santoflex 13, from Monsanto Chemicals; (8) N,N'-di(2-octyl)-4-phenylene diamine, Antozite-1, from Vanderbilt Corporation; and the like.

The second preferably opaque coating composition on the backside of the transparent substrate also preferably contains antistatic agents, fillers, and the like. The fillers are selected from the same group of materials as illustrated herein for the first layer components.

Antistatic agents or compounds of the second coating are, for example, selected from anionic and cationic materials, examples of the anionic antistatic components being (1) fatty ester modifications of phosphates Alkaphos B6-56A; (2) sulfosuccinic acid esters such as Alkasurf SS-O-75 [sodium dioctyl sulfosuccinate], Alkasurf SS-DA4-HE [ethoxylated alcohol sulfosuccinate], Alkasurf SS-L7DE [sodium sulfosuccinate ester of lauric diethanol amide], Alkasurf SS-L-HE [sodium lauryl sulfosuccinate], sulfonic acid, Alkasurf CA, [calcium dodecyl benzene sulfonate], Alkasurf 1 PAM [isopropylamine dodecyl benzene sulfonate]; (3) alkyl amines Alkamide SDO [soya diethanol amide], Alkamide CDE [coco diethanol amide], Alkamide CME [coco monoethanol amide], Alkamide L9DE [lauric diethanol amide], Alkamide L7Me [lauric monoethanol amide], Alkamide L1PA [lauric monoisopropylamide]; (4) fatty imidazolines and their derivatives such as Alkazine—O [oleic derivative], Alkazine TO [tail oil derivatives], Alkateric 2CIB (dicarboxylic cocoimidazoline sodium salt), all being available from Alkaril Chemicals.

Examples of cationic antistatic materials include (1) tetra octyl phosphonium bromide; (2) tetraethylammonium hexafluoro phosphate; (3) tetra butyl ammonium dihydrogen phosphate; (4) tetramethylammonium hydrogen phthalate; (5) (R)-(−)-3-pyrrolidinol hydrochloride; (6) bis-(tetramethylammonium) carbonate; (7) bis-(tetrabutylammonium) sulfate; (8) (2-acryloyloxy ethyl) (benzoyl benzyl) dimethylammoniumbromide; (9) (2-acryloyloxy ethyl) trimethyl ammonium methyl sulfate; (10) 2,5-dimethoxy-4-morpholino aniline dihydrochloride; (11) 4-bromo piperidine hydrobromide; (12) 3-amino-1H-isoindole hydrochloride; (13) (S)-(+)-2-amino-3-cyclohexyl-1-propanol hydrochloride, or mixtures thereof.

Examples of filler compounds include titanium dioxide (Rutile or Anatase from NL Chem Canada, Inc.); barium sulfate (K.C. Blanc Fix HD80, Kali Chemie Corporation); calcium carbonate (Microwhite Sylacauga Calcium Products); cellulosic materials substantially insoluble in water or substantially insoluble in organic solvents (such as those fillers available from Scientific Polymer Products); blends of calcium fluoride and silica, such as Opalex-C Kemira O.Y.; zinc oxide, such as Zoco Fax 183, Zo Chem; blends of zinc sulfide with barium sulfate, such as Lithopane, Schteben Company; and the like. The filler or pigments can enhance color mixing and assist in improving print-through in recording sheets of the present invention.

The coating compositions can be applied to the substrate by any suitable methods. For example, the coatings can be applied by a number of known techniques, including melt extrusion, reverse roll coating, solvent extrusion, and dip coating processes. In dip coating, a web of material to be coated is transported below the surface of the coating material (which generally is dissolved in a solvent) by a single roll in such a manner that the exposed site is saturated, followed by the removal of any excess coating by a blade, bar, or squeeze roll; the process is then repeated with the appropriate coating materials for application of the other layered coatings. With reverse roll coating, the premetered coating material (which generally is dissolved in a solvent) is transferred from a steel applicator roll onto the web material to be coated. The metering roll is stationary or is rotating slowly in the direction opposite to that of the applicator roll. In slot extrusion coating, a flat die is used to apply coating material (which generally is dissolved in a solvent) with the die lips in close proximity to the web of material to be coated. The die can have one or more slots if multilayers are to be applied simultaneously. In the multilayer slot coating, the coating solutions form a liquid stack in the gap where the liquids come in the contact with the moving web to form a coating. The stability of the interface between the two layers depends on wet thickness, density and viscosity ratios of both layers which need to be kept as close to one as possible. Once the desired amount of coating has been applied to the web, the coating is dried, typically at from about 25 to about 100° C. in an air drier.

Imaged substrates of the present invention in embodiments thereof exhibit reduced curl upon being printed with solid and liquid inks. Generally, the term "curl" refers to the distance between the base line of the arc formed by the imaged substrate when viewed in cross-section across its width (or shorter dimension, for example 8.5 inches in an 8.5 by 11 inch sheet, as opposed to length, or longer dimension, for example 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve.

The gloss values recited herein were obtained on a 75° Glossmeter, Glossgard II from Pacific Scientific (Gardner/Neotec Instrument Division).

The optical density measurements recited herein were obtained on a Pacific Spectrograph Color System. This system consists of two major components, an optical sensor and a data terminal. The optical sensor employs a 6-inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers (nm). The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the backside of a black printed area against a black background) measured at a wavelength of 560 nanometers.

Transparent refers for example, to a substrate with a Haze value of from about 0 to about 5 and preferably about 0 to about 1, and which Haze values were measured with a Haze meter; hydrophilic refers for example, to a material that prefers water, that is a material that is substantially soluble in water, or absorbs water; hydrophobic refers for example a material that is not soluble in water, or has a low solubility in water; colorant hydrophobic luminescent layer refers for example a layer that contains a mixture of a colorant, a polymer binder, a luminescent compound, such as pigments possessing luminescence, an antistatic compound, a lightfastness compound, and a filler like titanium dioxides; and dye mordant refers for example, to a compound that will fix a dye, that is a compound that attracts a dye, or dyes in the ink to the hydrophilic ink receiving layer.

More specifically a translucent recording substrate, such as a sheet refers to a substrate with a preferred haze value of from about 20 to about 70 and more preferably from about 30 to about 60; a transparent substrate refers to a substrate with a preferred haze value of from about 0 to about 20 and more preferably from about 0 to 10; opaque refers to a substrate that generally neither reflects nor emits light and which substrate has a preferred haze value of from about 70 to about 100 and more preferably from about 90 to about 100; and hydrophobic refers to a composition, or component that lacks affinity for water, that is the component is considered substantially water insoluble, thus when washed with water the component remains as is.

The opaque colorant luminescent layer is generally comprised of a colorant, a binder, a luminescent component, such as a pigment, a liquid crystalline material, an antistatic compound and a filler compound. In one embodiment the luminescent coating is comprised of from about 68.5 parts by weight to about 5 parts by weight and preferably from about 65 parts by weight to about 10 parts by weight of a polymeric binder, from about 30 parts by weight to about 1 parts by weight of a luminescent component, from about 0.5 part by weight to about 10 parts by weight and preferably from about 2 parts by weight to about 10 parts by weight of an antistatic compound, from about 0.5 parts by weight to about 10 parts by weight and preferably from about 2 parts by weight to about 10 parts by weight of a lightfastness compound, and from about 0.5 part by weight to about 74 parts by weight and preferably from about 1 part by weight to about 65 parts by weight of a filler, or pigment.

The wetting, or ink spreading agent compound when selected primarily enables an even flow of the ink on the surface of the recording substrate, the antistatic compound prohibits or minimizes the buildup of any static on the recording substrate and the traction filler compound enables the recording sheet to move easily through a device, like an ink jet printer. A dye mordant is usually considered as being a material which binds with the dye; a latex refers to a mixture of for example, water, and a polymer with no dye attached to it when it is blended with the coating composition; hydrophilic refers to a composition that has an affinity for water, that is it is preferably water soluble; and hydrophobic refers to a composition that lacks an affinity for water, that is, it is preferably water insoluble.

Specific embodiments of the present invention will now be described in detail. These Examples are intended to be illustrative, and the invention is not limited to the materials, conditions, or process parameters set forth in these embodiments. All parts and percentages are by weight unless otherwise indicated.

EXAMPLE I

Twenty coated inkjet recording sheets were prepared by the solvent extrusion process (single side each time initially) on a Faustel Coater using a one slot die, by providing for each MYLAR® sheets (roll form) in a thickness of 75 microns with an ink receiving coating or layer on one side, front side of the MYLAR®, for example, and which layer was generated from a hydrophilic blend comprised of 50.0 parts by weight of the binder hydroxypropyl methyl cellulose, (K35LV from Dow Chemicals); 20.0 parts by weight of the ink spreading agent 3-aminomethyl-3,5,5-trimethyl cyclohexanol, (Aldrich #19,479-4); 24.0 parts by weight of the dye mordant polymethyl acrylate trimethyl ammonium chloride latex containing 33 percent of the polymer, 64 percent of water, and 3 percent of an alcohol, and more specifically ispropanol); 3.0 parts by weight of the UV absorbing compound 2-(4-benzoyl-3-hydroxyphenoxy) ethylacrylate (Cyasorb UV-416, #41,321-6); 1.0 parts by weight of the antioxidant compound didodecyl-3,3'-thiodipropionate (Cyanox, LTDP, #D12,840-6); 1.0 part by weight of the antiozonant N-isopropyl-N'-phenyl-phenylene diamine, available as Santoflex-IP, from Monsanto Chemicals; 1.0 part by weight of the biocide poly (oxyethylene (dimethylamino)-ethylene (dimethylamino) ethylene dichloride) (Busan 77, Buckman Laboratories Inc.), and 1.0 part by weight of the colloidal silica, Syloid 74, which blend was present in a concentration of 5 percent by weight in a mixture of 80 parts by weight water and 20 parts by weight methanol. Subsequent to air drying at 100° C., the dried MYLAR® rolls, contained 1.0 gram, 11 microns in thickness of the ink receiving layer with the above components in the amounts indicated.

Rewinding the coated side onto an empty core, the uncoated MYLAR® backside was coated with a coating composition available from Rohm Haas and comprising 25 parts by weight of the acrylic emulsion latex binder, Rhoplex B-15J; 20 parts by weight of the colorant luminescence imparting compound Radiant R-105-812 orange-yellow obtained from Radiant Color Corp.; 9.0 parts by weight of the antistatic compound decamethylene bis trimethyl ammonium bromide, (Aldrich #28,547-1); 1.0 part by weight of the biocide poly(oxyethylene (dimethylamino)-ethylene (dimethylamino) ethylene dichloride) (Busan 77, Buckman Laboratories Inc.); 3.0 parts by weight of the UV absorbing compound poly[N,N-bis(2,2,6,6-tetramethyl-4-piperidinyl)-1,6-hexane diamine-co-2,4-dichloro-6-morpholino-1,3,5-triazine)] (Cyasorb UV-3346, #41,324-0, Aldrich Chemical Company); 2 parts by weight of the antioxidant compound N,N'-β,β'-naphthalene-p-phenylenediamine, Anchor DNPD, from Anchor Corporation, and 40 parts by weight of the pigment or filler calcium carbonate Microwhite (obtained from Sylacauga Calcium Products); the mixture was present in a concentration of 25 percent by weight in water. Subsequent to drying at 100° C., the sheets were coated with 700 milligrams of the above pigmented coating composition, to a thickness of 8 microns. The resulting two side coated inkjet recording sheets were then cut into 8.5 by 11 inch sheets.

The above prepared translucent recording sheets were printed with a Xerox Corporation ink jet test fixture equipped with a block heater and containing inks of the following compositions to, for example, determine print quality, drying times of the images, lightfastness and waterfastness.

Cyan: 15.75 percent by weight of sulfolane; 12.0 percent by weight of butyl carbitol; 2.0 percent by weight of ammonium bromide; 13.0 percent by weight acetyl ethanolamine; 0.015 percent by weight of ammonium hydroxide; 0.05 percent by weight of polyethylene oxide (molecular weight, $M_w$ 18,500), obtained from Union Carbide Company; 22.5 percent by weight of Projet Cyan 1 dye solution, obtained from Zeneca Colors; 18.75 percent by weight of Projet Blue OAM dye solution, obtained from Zeneca Colors, and 15.935 percent by weight of deionized water.

Magenta: 15.75 percent by weight of sulfolane; 12.0 percent by weight of butyl carbitol; 2.0 percent by weight of ammonium bromide; 13.0 percent by weight of acetyl ethanolamine; 0.03 percent by weight of ammonium hydroxide; 0.05 percent by weight of Dowicil 150 biocide, obtained from Dow Chemical Company, Midland, Mich.; 0.05 percent by weight of polyethylene oxide (molecular weight 18,500), obtained from Union Carbide Company; 25 percent by weight of Projet Magenta 1 T dye solution, obtained from Zeneca Colors; 6.0 percent by weight of Acid Red 52 solution obtained from Tricon Colors, and 26.12 percent by weight of deionized water.

Yellow: 15.75 percent by weight of sulfolane; 12.0 percent by weight of butyl carbitol; 13.0 percent by weight acetyl ethanolamine; 2.0 percent by weight of ammonium bromide; 0.03 percent by weight of ammonium hydroxide; 0.05 percent by weight of Dowicil 150 biocide, obtained from Dow Chemical Company, Midland, Mich.; 0.05 percent by weight of polyethylene oxide (molecular weight 18,500), obtained from Union Carbide Company; 27.0 percent by weight of Projet Yellow 1 G dye (7.5 percent solution), obtained from Zeneca Colors; 20.0 percent by weight of Acid Yellow 17 solution obtained from Tricon Colors, and 10.12 percent by weight of deionized water.

Black: 20.0 percent by weight of sulfolane (Aldrich T2, 220-9); 5.0 percent by weight of pantothenol, (Aldrich 29,578-7); 5.0 percent by weight of 1,4-bis (2-hydroxyethoxy)-2-butyne (Aldrich B4, 470-8); 5.0 percent by weight of, 2,2'-sulfonyldiethanol (Aldrich 18,008-4), obtained from Aldrich Chemical Company; 0.05 percent by weight of Dowicil 150 biocide, obtained from Dow Chemical Company, Midland, Mich.; 0.05 percent by weight of polyethylene oxide (molecular weight 18,500), obtained from Union Carbide Company; 7.0 percent by weight carbon black Levanyl A-SF [25.0 ml of predispersed Carbon Black Levanyl A-SF dispersion containing 28.0 percent solids of carbon black and 6.0 percent dispersant], obtained from Bayer A. G. of Germany, and 39.90 percent by weight of deionized water.

Images with 100 percent ink coverage were generated on twenty of the above prepared recording sheets by printing block patterns with the above magenta, cyan, yellow, and black inks. Ten of these transparent recording sheets were dried without heat and the other ten with the dryer on [dryer temperature of between 120° C. to 150° C., recording sheet temperature of about 50° C. to 60° C.]. The drying times of resulting images were measured to be 2 minutes [yellow], 5 minutes [cyan], 5 minutes [magenta], 10 minutes [black], in the absence of heat and 1 minute [yellow], 2 minutes [cyan], 2 minutes [magenta], 3 minutes.[black], in the presence of heat. The resulting images yielded optical density values of 1.85 black, 1.50 cyan, 1.45 magenta and 0.85 yellow. These images had lightfast values of greater than 95 percent and, more specifically, about 98 percent average for all colors after a period of six months, and showed no intercolor bleed when retained at 80 percent humidity at 80° F. for a period of seven days.

EXAMPLE II

Twenty coated inkjet recording sheets were prepared by the solvent extrusion process (single side each time initially) on a Faustel Coater using a one slot die, by providing for each MYLAR® sheet (roll form) in a thickness of 75 microns a coating generated from a hydrophilic blend comprised of 50.0 parts by weight of the binder ethyl hydroxyethyl cellulose (Bermocoll, Berol Kem. A. B. Sweden); 20.0 parts by weight of the ink spreading agent 2-amino-3-methylbenzylalcohol, (Aldrich #33,419-7); 24.0 parts by weight of the dye mordant polymethyl acrylate trimethyl ammonium chloride latex; 3.0 parts by weight of UV absorbing compound 2-(4-benzoyl-3-hydroxyphenoxy) ethylacrylate, (Cyasorb UV-416, #41,321-6); 1.0 part by weight of an antioxidant compound didodecyl-3,3'-thiodipropionate (Cyanox, LTDP, #D12, 840-6); 1.0 part by weight of an antiozonant N-isopropyl-N'-phenyl-phenylene diamine, available as Santoflex-IP, from Monsanto Chemicals; 1.0 part by weight of the biocide poly(oxyethylene (dimethylamino)-ethylene (dimethylamino) ethylene dichloride) (Busan 77, Buckman Laboratories Inc.), and 1.0 part by weight of colloidal silica, Syloid 74, which blend was present in a concentration of 5 percent by weight in a mixture of 80 parts by weight water and 20 parts by weight methanol. Subsequent to air drying at 100° C., the dried MYLAR® rolls contained 1.0 gram, 11 microns in thickness, of the above coating in the amounts recited.

Rewinding the coated side onto an empty core, the uncoated MYLAR® backside was coated with a coating composition comprising 25 parts by weight ethylcellulose, Ethocel N-22, Hercules Chemical Company; 10 parts by weight of the liquid crystalline compound 1-isothiocyanato-4-(trans-4-octylcyclo hexyl) benzene, Aldrich #36,686-2; 10 parts by weight of the luminescence colorant imparting compound Radiant R-105-812 orange-yellow obtained from Radiant Color Corp.; 9.0 parts by weight of an antisatic compound decamethylene bis trimethyl ammonium bromide, (Aldrich #28,5471-1); 1.0 part by weight of the biocide poly(oxyethylene (dimethylamino)-ethylene (dimethylamino) ethylene dichloride) (Busan 77, Buckman Laboratories Inc.); 3.0 parts by weight of the UV absorbing compound poly[N,N-bis(2,2,6,6-tetramethyl-4-piperidinyl)-1,6-hexanediamine-co-2,4-dichloro-6-morpholino-1,3,5-triazine) (Cyasorb UV-3346, #41,324-0, Aldrich Chemical Company); 2 parts by weight of the antioxidant compound N,N'-β,β'-naphthalene-ρ-phenylenediamine, Anchor DNPD, from Anchor Corporation, and 40 parts by weight of the filter calcium carbonate Microwhite (obtained from Sylacauga Calcium Products); the mixture was present in a concentration of 25 percent by weight in toluene. Subsequent to drying at 100° C., the sheets were coated with 700 milligrams of the above coating, in a thickness of 8 microns. The two side coated ink jet recording sheets were then cut into 8.5 by 11 inch sheets.

The above prepared recording sheets were printed with a Xerox Corporation ink jet test fixture equipped with a block heater and containing the inks of Example I to, for example, determine print quality, drying times of the images, lightfastness and waterfastness.

Images with 100 percent ink coverage were generated on twenty of the above prepared transparent recording sheets by printing block patterns of magenta, cyan, yellow, and black. Ten of these transparent recording sheets were dried without heat and the other ten with the dryer on [dryer temperature of between 120° C. to 150° C., sheet temperature of about 50° C. to 60° C]. The drying times of the resulting images were measured to be 2 minutes [yellow], 5 minutes [cyan], 5 minutes [magenta], 10 minutes [black], in the absence of heat and 1 minute [yellow], 2 minutes [cyan], 2 minutes [magenta], 3 minutes [black], in the presence of heat. The resulting images yielded optical density values of 1.80 black, 1.55 cyan, 1.42 magenta and 0.83 yellow. These images had lightfastness values of greater than 95 percent and, more specifically, about 99 percent average for all colors after a period of six months, and showed no intercolor bleed when retained at 80 percent humidity at 80° F. for a period of seven days. These images could be visualized in the dark.

EXAMPLE III

Twenty coated inkjet recording sheets were prepared by the solvent extrusion process (single side each time initially) on a Faustel Coater using a one slot die, by providing for each MYLAR® sheets (roll form) in a thickness of 75 microns with a coating generated from a hydrophilic blend comprised of 50.0 parts by weight of binder hydroxypropyl methyl cellulose, (K35LV from Dow Chemicals); 20.0 parts by weight of the ink spreading agent 4-(3-aminopropyl) morpholine (Aldrich #12,309-9); 24.0 parts by weight of the dye mordant polymethyl acrylate trimethyl ammonium chloride latex; 3.0 parts by weight of UV absorbing compound 2-(4-benzoyl-3-hydroxyphenoxy)ethylacrylate (Cyasorb UV-416, #41,321-6); 1.0 part by weight of the antioxidant compound didodecyl-3,3'-thiodipropionate (Cyanox, LTDP, #D12,840-6); 1.0 part by weight of the antiozonant N-isopropyl-N'-phenyl-phenylene diamine, Santoflex-IP, from Monsanto Chemicals; 1.0 part by weight of the biocide poly (oxyethylene (dimethylamino)-ethylene (dimethylamino) ethylene dichloride) (Busan 77, Buckman Laboratories Inc.), and 1.0 part by weight of the colloidal silica, Syloid 74, and which resulting blend was present in a concentration of 5 percent by weight in a mixture of 80 parts by weight water and 20 parts by weight methanol. Subsequent to air drying at 100° C., the dried MYLAR® rolls contained 1.0 gram, 11 microns in thickness, of the above components.

Rewinding the coated side onto an empty core, the uncoated MYLAR® backside was coated with a coating composition comprising 25 parts by weight of an acrylic emulsion latex, Rhoplex B-15J; 20 parts by weight of luminescence imparting compound Radiant R-105-812 orange-yellow obtained from Radiant Color Corp.; 9.0 parts by weight of an antistatic compound decamethylene bis trimethyl ammonium bromide, (Aldrich #28,547-1); 1.0 part by weight of the biocide poly(oxyethylene (dimethylamino)-ethylene (dimethylamino) ethylene dichloride) (Busan 77, Buckman Laboratories Inc.); 3.0 parts by weight of the UV absorbing compound poly[N,N-bis(2,2,6,6-tetramethyl-4-piperidinyl)-1,6-hexane diamine-co-2,4-dichloro-6-morpholino-1,3,5-triazine) (Cyasorb UV-3346, #41,324-0, Aldrich Chemical Company); 2 parts by weight of an antioxidant compound N,N'-β,β'-naphthalene-ρ-phenylenediamine, Anchor DNPD, from Anchor Corporation, and 40 parts by weight of the filler calcium carbonate Microwhite (obtained from Sylacauga Calcium Products); the mixture was present in a concentration of 25 percent by weight in water. Subsequent to drying at 100° C., the sheets were coated with 700 milligrams of the above coating, in a thickness of 8 microns. The resulting two side coated inkjet recording sheets were then cut into 8.5 by 11 inch sheets.

The above prepared translucent recording sheets were printed with a Xerox Corporation ink jet test fixture equipped with a block heater and containing inks of Example I to, for example, determine check print quality, drying times of the images, lightfast and water fast values.

Images with 100 percent ink coverage were generated on twenty of the above generated transparent recording sheets by printing block patterns for magenta, cyan, yellow, and black. Ten of these transparent recording sheets were dried without heat and the other ten with the dryer on [dryer temperature of between 120° C. to 150° C., transparency temperature of about 50° C. to 60° C.]. The drying times of resulting images were measured to be 2 minutes [yellow], 5 minutes [cyan], 5 minutes [magenta], 10 minutes [black], in the absence of heat and 1 minute. [yellow], 2 minutes [cyan], 2 minutes [magenta], 3 minutes [black], in the presence of heat. The resulting images yielded optical density values of 1.75 black, 1.60 cyan, 1.55 magenta and 0.80 yellow. These images had lightfast values of greater than 95 percent and, more specifically, about 98 percent average for all colors after a period of six months, and showed no intercolor bleed when retained at 80 percent humidity at 80° F. for a period of seven days. These images could be visualized in the dark.

Other embodiments and modifications of the present invention may occur to those skilled in the art subsequent to a review of the information presented herein, these embodiments and modifications, as well as equivalents thereof, are also included within the scope of this invention.

What is claimed is:

1. A recording component comprising a transparent substrate situated between a hydrophilic ink receiving layer and a colorant hydrophobic luminescent layer wherein said ink receiving layer contains an ink spreading compound; and further wherein said hydrophobic luminescent layer contains a luminescent component which comprises an inorganic phosphor, an organic phosphor, a polymeric phosphor, a liquid crystalline nitrile or a liquid crystalline isothionitrile.

2. A recording component according to claim 1 wherein the substrate is selected from the group consisting of (1) polyethylene terephthalate; (2) polyethylene naphthalate; (3) polysulfone; (4) cellulose triacetate; (5) polyvinyl chloride; and (6) polypropylene.

3. A recording component according to claim 1 wherein the ink receiving layer is comprised of a hydrophilic polymeric binder, a dye mordant, an ink spreading compound, a lightfastness component, a filler, and a biocide.

4. A recording component according to claim 3 wherein the hydrophilic polymeric binder is present in an amount of from about 34 parts by weight to about 83 parts by weight, the ink spreading compound is present in an amount of from about 25 parts by weight to about 5 parts by weight, the dye mordant is present in an amount of from about 25 parts by weight to about 5 parts by weight, the lightfastness component is present in an amount of from about 12 parts by weight to about 1 part by weight, the filler is present in an amount of from about 1 part by weight to about 5 parts by weight, and the biocide is present in an amount of from about 3 parts by weight to about 1 part by weight, and wherein the total of said components is about 100 percent.

5. A recording component according to claim 3 wherein the hydrophilic binder is selected from the group consisting of (1) ethylhydroxyethyl cellulose; (2) hydroxyethyl cellulose; (3) hydroxyethylmethyl cellulose; (4) hydroxypropylmethylcellulose; (5) sodium carboxymethyl cellulose; (6) poly(ethylene oxide); and mixtures thereof.

6. A recording component according to claim 3 wherein the hydrophilic binder is (1) ethylhydroxyethyl cellulose, or (2) hydroxypropyl methyl cellulose.

7. A recording component in accordance with claim 3 wherein said lightfastness component is comprised of a mixture of a UV absorber, an antioxidant, an antiozonant, or mixtures thereof.

8. A recording component in accordance with claim 7 wherein said antiozonant optionally present in amounts of from about 8 parts by weight to about 0.5 part by weight, is (1) N-isopropyl-N'-phenyl-phenylene diamine, (2) N,N'-di (2-octyl)-4-phenylene diamine, or (3) 2,4,6-tris-(N-1,4-dimethyl pentyl-4-phenylene diamino)-1,3,5-triazine.

9. A recording component in accordance with claim 9 wherein the lightfastness component is (1) octyl salicylate, (2) hexadecyl-3,5-ditert-butyl-4-hydroxy-benzoate, (3) 4-allyloxy-2-hydroxy benzophenone; (4) 2-(4-benzoyl-3-hydroxyphenoxy) ethylacrylate, (5) 2-dodecyl-N-(1,2,2,6,6-pentamethyl-4-piperidinyl)succinimide, or (6) poly[N,N-bis (2,2,6,6-tetramethyl-4-piperidinyl)-1,6-hexane diamine-co-2,4-dichloro-6-morpholino-1,3,5-triazine).

10. A recording component in accordance with claim 3 wherein the biocide is a nonionic biocide, an anionic biocide, or a cationic biocide.

11. A recording component according to claim 1 wherein the thickness of the ink receiving layer is from about 0.1 to about 25 microns.

12. A recording component according to claim 1 wherein said ink spreading compound present in amounts of from about 40 parts by weight to about 1 part by weight, and which compound is selected from the group consisting of amino alcohols, heterocyclic amines, and acid salts.

13. A recording component according to claim 12 wherein the ink spreading amino alcohols of the ink receiving layer are selected from the group consisting of (1) 2-(2-aminoethoxy) ethanol; (2) 2-amino-3-cyclohexyl-1-propanol; (3) amino hexanol; (4) 2-amino-3-methylbenzyl alcohol; and (5) 3-aminomethyl-3,5,5-trimethyl cyclohexanol.

14. A recording component according to claim 12 wherein the ink spreading heterocyclic amines of the ink receiving layer are selected from the group consisting of (1) 1-(3-amino-propyl)-2-pyrrolidone; (2) 4-(2-aminoethyl) morpholine; (3) 4-(3-aminopropyl) morpholine; (4) 1-(2-aminoethyl) piperazine; and (5) 4-amino-2,2,6,6-tetramethylpiperidine.

15. A recording component according to claim 12 wherein the ink spreading acid salts are selected from the group consisting of (1) tetra ethyl ammonium hexafluoro phosphate; (2) (R)-3-pyrrolidinolhydrochloride; (3) 4-bromopiperidine hydrobromide; (4) 3-amino-1H-isoindole hydrochloride; and (5) (S)-(+)-2-amino-3-cyclohexyl-1-propanol hydrochloride.

16. A recording component according to claim 12 wherein the ink spreading compounds are (1) 2-amino-3-methylbenzyl alcohol; (2) 3-aminomethyl-3,5,5-trimethyl cyclohexanol; (3) 4-(2-aminoethyl) morpholine, or (4) (S)-(+)-2-amino-3-cyclohexyl-1-propanol hydrochloride.

17. A recording component according to claim 1 wherein the colorant layer is comprised of a polymeric binder, an antistatic agent, a pigment, a lightfastness compound and a biocide.

18. A recording component according to claim 1 wherein the colorant layer is comprised of from about 68 parts by weight to about 5 parts by weight of a polymeric binder, from about 30 parts by weight to about 1 part by weight of said luminescence imparting compound, from about 0.5 part by weight to about 10 parts by weight of an antistatic agent, from about 0.5 part by weight to about 10 parts by weight of a lightfastness compound, and from about 0.5 part by weight to about 74 parts by weight of a filler, and wherein the total of said amounts is about 100 parts.

19. A recording component according to claim 1 wherein said luminescent compound is present in amounts of from about 30 parts by weight to about 1 part by weight, and which compound is selected from the group consisting of inorganic phosphors, organic phosphors and polymeric phosphors.

20. A recording component according to claim 1 wherein said luminescent component is present in amounts of from about 30 parts by weight to about 1 part by weight, and which component is selected form the group consisting of nitrile functional liquid crystalline compounds of (1) 4-(trans-4-pentyl cyclohexyl) benzonitrile; (2) 4'-pentyl-4-biphenyl carbonitrile; (3) 4'-(pentyloxy)4-biphenylcarbonitrile; (4) 4'-hexyl-4-biphenyl carbonitrile; (5) 4'-(hexyloxy)-4-biphenylcarbonitrile; (6) 4'-heptyl-4-biphenyl carbonitrile; (7) 4'-heptyloxy-4-biphenyl carbonitrile; (8) 4'-octyl-4-biphenyl carbonitrile; and (9) 4'-(octyloxy)-4-biphenyl carbonitrile.

21. A recording component according to claim 1 wherein said luminescent component is present in amounts of from about 30 parts by weight to about 1 part by weight, and which component is selected from the group of (1) 1 isothiocyanato-4-(trans-4-propylcyclohexyl) benzene; (2) 1-(trans-4-hexylcyclo hexyl)-4-isothiocyanato benzene; (3) 1-isothiocyanato-4-(trans-4-octylcyclohexyl) benzene; (4) 1-hexyl-4-(4-isothiocyanato phenyl) bicyclo[2.2.2]octane; (5) 1-(4-trans-hexylcyclohexyl)-4-[2-(4-isothiocyanatophenyl)ethyl]benzene; and (6) 4-isothiocyanato phenyl)-4-pentyl bicyclo[2.2.2]octane-1-carboxylate.

22. A recording component according to claim 1 wherein the colorant layer contains a liquid crystalline compound of (1) 4-(trans-4-pentyl cyclohexyl) benzonitrile; (2) 4'-(octyloxy)-4-biphenyl carbonitrile; or (3) 1-isothiocyanato-4-(trans-4-propylcyclohexyl) benzene, 4-isothiocyanato phenyl) 4-pentyl bicyclo [2.2.2] octane-1-carboxylate.

23. A recording component according to claim 1 wherein the ink layer contains a polymer binder optionally present in an amount of from about 68 parts by weight to about 5 parts by weight, and which binder is selected from the group consisting of (1) a polyester latex; (2) an acrylic-vinyl acetate copolymer emulsion; (3) an ethyl cellulose; (4) a hydroxyethyl cellulose methacrylate; and (5) a poly (vinylidene fluoride-co-hexafluoropropylene).

24. A recording component according to claim 1 wherein the colorant in said hydrophobic luminescent layer is a pigment present in an amount of from about 0.5 to about 74 parts by weight, and which pigment is (1) titanium dioxide; (2) barium sulfate; (3) mixtures of calcium fluoride and silica; (4) zinc oxide; (5) mixtures of zinc sulfide and barium sulfate, or mixtures thereof of (1) to (5).

25. A recording component according to claim 1 wherein the thickness of the colorant coating is from about 0.1 to about 25 microns.

26. A recording component in accordance with claim 1 wherein the lightfastness component is (1) octyl salicylate, Escalol-106; (2) hexadecyl-3,5-di-tert-butyl-4-hydroxy-benzoate, Cyasorb UV-2908; (3) 4-allyloxy-2-hydroxy benzophenone; (4) 2-(4-benzoyl-3-hydroxyphenoxy) ethylacrylate, Cyasorb UV-416; (5) 2-dodecyl-N-(1,2,2,6,6-pentamethyl-4-piperidinyl)succinimide, Cyasorb UV-3604; and (6) poly[N,N-bis(2,2,6,6-tetramethyl-4-piperidinyl)-1,6-hexane diamine-co-2,4-dichloro-6-morpholino-1,3,5-triazine).

27. A lightfast translucent recording component in accordance with claim 1 wherein the substrate is comprised of a polyester coated thereover with a (1) transparent ink receiving layer comprised of a binder, a lightfastness compound, a dye mordant, and a filler and in contact with aid substrate a coating (2) comprised of an opaque fluorescent pigment, a pigment dispersant and an antistatic compound.

28. A printing process utilizing the recording sheet of claim 1.

29. A recording component consisting essentially of a transparent substrate situated between a hydrophilic ink receiving layer and a colorant hydrophobic luminescent layer wherein said ink receiving layer contains an ink spreading compound; and further wherein said hydrophobic luminescent layer contains a luminescent component which comprises an inorganic phosphor, an organic phosphor, a polymeric phosphor, a liquid crystalline nitrile, or a liquid crystalline isothionitrile.

* * * * *